(12) United States Patent
Tomomori et al.

(10) Patent No.: US 9,700,928 B2
(45) Date of Patent: Jul. 11, 2017

(54) STEEL PLATE FOR PRODUCING PIPE HIGHLY RESISTANT TO FUEL VAPOR CORROSION, PIPE USING SAME AND METHOD FOR PRODUCING PIPE

(75) Inventors: Tatsuo Tomomori, Yamaguchi (JP); Koh Yoshioka, Yamaguchi (JP)

(73) Assignee: TOYO KOHAN CO., LTD., Tokyo (JP)

( * ) Notice: Subject to any disclaimer, the term of this patent is extended or adjusted under 35 U.S.C. 154(b) by 107 days.

(21) Appl. No.: 13/814,502

(22) PCT Filed: Aug. 4, 2011

(86) PCT No.: PCT/JP2011/004447
§ 371 (c)(1),
(2), (4) Date: Mar. 8, 2013

(87) PCT Pub. No.: WO2012/017674
PCT Pub. Date: Feb. 9, 2012

(65) Prior Publication Data
US 2013/0199657 A1 Aug. 8, 2013

(30) Foreign Application Priority Data
Aug. 6, 2010 (JP) .................................. 2010-176960

(51) Int. Cl.
*F16L 9/14* (2006.01)
*B21D 51/16* (2006.01)
(Continued)

(52) U.S. Cl.
CPC .............. *B21D 51/16* (2013.01); *B21C 37/09* (2013.01); *B21D 5/10* (2013.01); *B21D 7/02* (2013.01);
(Continued)

(58) Field of Classification Search
CPC ............ B21D 51/16; B21D 5/10; B21C 37/09
(Continued)

(56) References Cited

U.S. PATENT DOCUMENTS 4,795,503 A * 1/1989 Takahashi et al. ............ 148/518
4,885,215 A * 12/1989 Yoshioka et al. .............. 428/632
(Continued)

FOREIGN PATENT DOCUMENTS

JP H03-207891 9/1991
JP 5-9786 A 1/1993
(Continued)

OTHER PUBLICATIONS

International Search Report with English translation, mailing date Oct. 25, 2011, for corresponding International Application No. PCT/JP2011/004447.

*Primary Examiner* — Patrick M Buechner
*Assistant Examiner* — Michael J Melaragno
(74) *Attorney, Agent, or Firm* — Intellectual Property Law Group LLP

(57) ABSTRACT

Provided are a pipe which exhibits corrosion resistance against vapor of fuel such as gasoline, diesel oil, bioethanol or a biodiesel fuel, a method for manufacturing the pipe, and a steel sheet for manufacturing the pipe. A method for manufacturing a pipe having a bent portion which has excellent corrosion resistance against fuel vapor includes the steps of; preparing a steel sheet for manufacturing a pipe which is characterized by having a zinc-nickel (Zn—Ni) alloy layer where a nickel content is 4 to 16 at % on at least one surface of the steel sheet; forming the steel sheet for manufacturing a pipe into a tubular shape such that the Zn—Ni alloy layer forms an inner surface of the pipe, and applying bending to the pipe such that the elongation of the bent convex portion generated at the time of bending the
(Continued)

pipe falls within 20%. A steel sheet for manufacturing a pipe having excellent corrosion resistance against fuel vapor has a Zn—Ni alloy layer on at least an uppermost surface of a surface thereof which constitutes an inner surface of the pipe, and a nickel content in the Zn—Ni alloy layer is 4 to 16 at %.

2 Claims, 3 Drawing Sheets

(51) Int. Cl.

| | | |
|---|---|---|
| *B21D 7/02* | (2006.01) | |
| *C25D 3/56* | (2006.01) | |
| *C25D 5/48* | (2006.01) | |
| *B21D 5/10* | (2006.01) | |
| *F16L 9/02* | (2006.01) | |
| *C25D 7/04* | (2006.01) | |
| *B21C 37/09* | (2006.01) | |
| *B21D 35/00* | (2006.01) | |
| *F02M 37/00* | (2006.01) | |

(52) U.S. Cl.
CPC ............ *B21D 35/005* (2013.01); *C25D 3/565* (2013.01); *C25D 5/48* (2013.01); *C25D 7/04* (2013.01); *F16L 9/02* (2013.01); *F02M 37/00* (2013.01); *Y10T 428/12799* (2015.01)

(58) Field of Classification Search
USPC .......................................... 138/146; 428/680
See application file for complete search history.

(56) References Cited

U.S. PATENT DOCUMENTS

| | | | | |
|---|---|---|---|---|
| 5,277,228 | A * | 1/1994 | Yamanashi | 138/143 |
| 5,297,410 | A * | 3/1994 | Goff | 72/47 |
| 5,312,026 | A * | 5/1994 | Yamanashi | 228/144 |
| 5,335,841 | A * | 8/1994 | Yamanashi | 228/149 |
| 5,482,090 | A * | 1/1996 | Yamanashi | 138/171 |
| 6,071,631 | A * | 6/2000 | Takahata | 428/658 |
| 6,143,430 | A * | 11/2000 | Miyasaka et al. | 428/659 |
| 6,276,400 | B1 * | 8/2001 | Jackson et al. | 138/143 |
| 6,325,107 | B1 * | 12/2001 | Usui | 138/146 |
| 6,397,896 | B2 * | 6/2002 | Takahashi et al. | 138/146 |
| 6,668,455 | B2 * | 12/2003 | Duvall et al. | 29/890.141 |
| 6,802,430 | B2 * | 10/2004 | Tomimura et al. | 220/562 |
| 6,976,510 | B2 * | 12/2005 | Campagna et al. | 138/137 |
| 8,091,588 | B2 * | 1/2012 | Burke, II | 138/143 |
| 8,439,086 | B2 * | 5/2013 | Burke, II | 138/143 |
| 2005/0031894 | A1 * | 2/2005 | Klos et al. | 428/659 |
| 2005/0236060 | A1 * | 10/2005 | Matsubara | 138/143 |
| 2007/0261752 | A1 * | 11/2007 | McClung et al. | 138/137 |
| 2012/0234426 | A1 * | 9/2012 | Tomomori et al. | 138/140 |
| 2012/0234428 | A1 * | 9/2012 | Tomomori et al. | 138/146 |
| 2013/0098496 | A1 * | 4/2013 | Takagi | 138/143 |
| 2013/0327435 | A1 * | 12/2013 | Kaneta et al. | 138/145 |

FOREIGN PATENT DOCUMENTS

| | | |
|---|---|---|
| JP | H05-106058 | 4/1993 |
| JP | H08-225984 | 9/1996 |
| JP | 9-324282 A | 12/1997 |
| JP | 2002-242779 A | 8/2002 |
| JP | 2009-113066 A | 5/2009 |

* cited by examiner (a)

(a) Calculation used when specimen is plate material

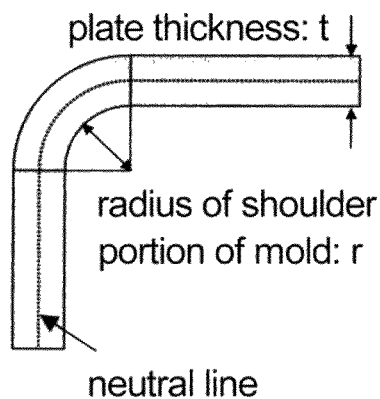

plate thickness: t radius of shoulder portion of mold: r neutral line $$\text{elongation}(\%) = \frac{t}{2(r + \frac{t}{2})} \times 100$$

*radius of curvature of bent portion : $r + \frac{t}{2}$ (b) Calculation used when specimen is pipe material

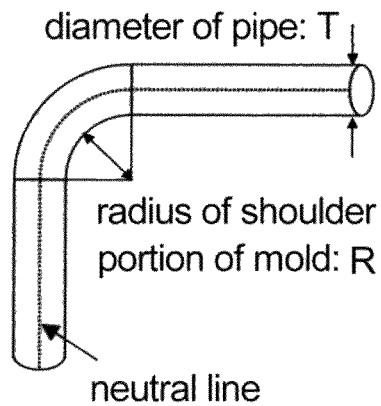

diameter of pipe: T radius of shoulder portion of mold: R neutral line $$\text{elongation}(\%) = \frac{T}{2(R + \frac{T}{2})} \times 100$$

*radius of curvature of bent portion : $R + \frac{T}{2}$

STEEL PLATE FOR PRODUCING PIPE HIGHLY RESISTANT TO FUEL VAPOR CORROSION, PIPE USING SAME AND METHOD FOR PRODUCING PIPE

TECHNICAL FIELD

The present invention relates to a steel sheet for manufacturing a pipe having excellent corrosion resistance against fuel vapors, a pipe which is manufactured using the steel sheet, and a method for manufacturing the pipe.

BACKGROUND ART

Recently, for reducing a greenhouse effect gas, the movement toward the use of so-called bioethanol mixed gasoline produced by mixing bioethanol which is considered neutral to carbon into gasoline has been advancing steadily. However, when ethanol is added to gasoline, gasoline is liable to absorb moisture and hence, there is a possibility that water is mixed into gasoline in a fuel tank. Further, when ethanol mixed gasoline is left for a long period, gasoline is deteriorated and an organic acid is formed in gasoline.

In this manner, when a moisture absorbed state and the deterioration of gasoline take place, ethanol can be mixed into both water and gasoline and hence, there arises a state where both water and an organic acid are contained in gasoline whereby there may be a case where a mixture of water and an organic acid is vaporized from a surface of gasoline. In such a case, there is a possibility that an inner surface of a pipe which is usually brought into contact with only gasoline vapor having substantially no corrosiveness is placed under a strong corrosive environment.

Accordingly, a pipe which is placed under an atmosphere of bioethanol mixed gasoline is required to possess corrosion resistance which is determined by taking into account also such a corrosive environment caused by fuel vapors.

Conventionally, as a material sheet for manufacturing a fuel pipe for an automobile, a cold-rolled steel sheet without further treatment or a copper plated steel sheet has been popularly used. Further, a pipe which is manufactured using a stainless steel sheet as a material sheet and a pipe to which Sn—Zn plating is applied have been proposed.

For example, patent literature 1 describes a galvanized steel sheet for a fuel container aiming at the enhancement of durability of an inner surface of the fuel container against fuel, the enhancement of corrosion resistance of an outer surface after coating and the like, wherein the galvanized steel sheet is manufactured such that a post-treatment film is applied to a surface of a galvanized steel sheet by 0.1 to 2.0 g/m² as a coating weight, and then the galvanized steel sheet is dried by controlling a drying condition of the post-treatment film where a temperature of the galvanized steel sheet is elevated by heating from a plated surface side at a heating rate of 20° C./s or more to dry the post-treatment film.

PRIOR ART DOCUMENT

Patent Literature

Patent Literature 1: JP-A-2006-89792

SUMMARY OF THE INVENTION

Problems that the Invention is to Solve

However, the corrosion resistance described in the above-mentioned patent literature 1 is the corrosion resistance of a portion such as a fuel tank which is immersed in fuel for an automobile such as gasoline and is brought into direct contact with the fuel for an automobile, and is not the corrosion resistance of a pipe having a bent portion against vapors.

That is, the above-mentioned patent literature 1 relates to the press formability of the tank and fuel corrosion resistance after press forming. As an environment where a fuel supply pipe is actually used, the number of cases where the pipe is exposed to vapor of highly volatile fuel for an automobile is overwhelmingly larger than the number of cases where the pipe is directly exposed to fuel for an automobile.

Internationally, the problem on exhaustion of fossil fuels has been becoming serious, and the use of bioethanol, bio-diesel fuel and the like has been spreading.

In this manner, a plated steel sheet having sufficient properties against bioethanol, bio-diesel fuel and vapors of gasoline, bioethanol and bio-diesel fuel in addition to gasoline which has been conventionally used as fuel for an automobile has the drawback from a viewpoint of safety.

Further, when a plated steel sheet is used as a material for manufacturing a pipe, in view of avoiding problems in mounting the pipe, it is often the case where many bent portions are formed on the pipe after forming the plated steel sheet into the pipe so that a plating film is required to possess high corrosion resistance and the property that the plating film follows the bending of the pipe.

Accordingly, the present invention has been made to overcome the above-mentioned conventional problems, and it is an object of the present invention to provide a steel sheet for manufacturing a pipe having sufficient corrosion resistance against fuel, particularly against vapor of fuel such as gasoline, bioethanol, light oil (diesel oil) or bio-diesel fuel also at a bent portion. Further, it is another object of the present invention to provide a pipe which is manufactured using the steel sheet and a method for manufacturing the pipe.

Means for Solving the Problems (1) According to the present invention, there is provided a method for manufacturing a pipe having a bent portion which has excellent corrosion resistance against fuel vapor, the method including the steps of: preparing a steel sheet for manufacturing a pipe which is characterized by having a zinc-nickel (Zn—Ni) alloy layer where a nickel content is 4 to 16 at % on at least one surface of the steel sheet; forming the steel sheet for manufacturing a pipe into a tubular shape such that the Zn—Ni alloy layer forms an inner surface of the pipe; and applying bending to the pipe such that the elongation of a bent convex portion generated at the time of bending the pipe falls within 20%.

(2) The method for manufacturing a pipe having a bent portion according to the present invention is, in the above-mentioned constitution (1), characterized in that the fuel includes gasoline, bioethanol, diesel oil or bio-diesel fuel.

(3) According to the present invention, there is provided a steel sheet for manufacturing a pipe having excellent corrosion resistance against fuel vapor, wherein the steel sheet has a zinc-nickel (Zn—Ni) alloy layer on at least an uppermost surface of a surface thereof which constitutes an inner surface of the pipe, a nickel content in the Zn—Ni alloy layer is 4 to 16 at %, and the Zn—Ni alloy layer is capable of following bending where the elongation of a bent convex portion of the pipe generated at the time of bending the pipe falls within a range of 20%.

(4) The steel sheet for manufacturing a pipe according to the present invention is, in the constitution (3), characterized in that the fuel includes gasoline, bioethanol, diesel oil or bio-diesel fuel.

(5) According to the present invention, there is provided a pipe having excellent corrosion resistance against fuel vapor, wherein the pipe has a zinc-nickel (Zn—Ni) alloy layer on at least an uppermost surface of an inner surface of the pipe, and the Zn—Ni alloy layer is capable of following bending where the elongation of a bent convex portion of the pipe generated at the time of bending the pipe falls within a range of 20%.

(6) The pipe according to the present invention is characterized in that the fuel includes gasoline, bioethanol, diesel oil or bio-diesel fuel.

Advantageous Effects of the Invention

The pipe and the steel sheet for manufacturing the pipe according to the present invention have the corrosion resistance against fuel vapor and hence, even when they are exposed to vapor of fuel such as gasoline, bioethanol, diesel oil or bio-diesel fuel which constitutes fuel, it is possible to suppress the formation of rust on the pipe. Further, at the time of bending the pipe in the pipe forming operation, a plating film follows such bending and hence, it is possible to suppress the formation of rust on the bent portion.

BRIEF EXPLANATION OF DRAWINGS

FIG. 4 is an explanatory view of a calculation formula of the elongation of a bent convex portion generated at the time of bending the pipe.

MODE FOR CARRYING OUT THE INVENTION

Figure 1:
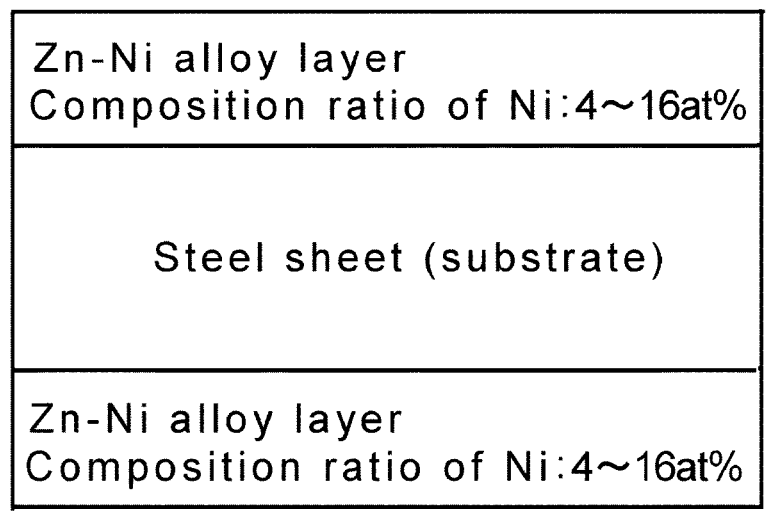
FIG. 1 is a schematic explanatory view showing the layer constitution of a steel sheet having a Zn—Ni alloy layer according to the present invention.

An embodiment of the present invention is explained in detail hereinafter.

<Steel Sheet>

Usually, a low carbon aluminum-killed hot-rolled coil is used as a material sheet to be plated for manufacturing a steel sheet for manufacturing a pipe. As the material sheet, it is also possible to use a coil manufactured by using ultra low carbon steel which contains 0.003 mass % or less of carbon, or a coil manufactured by using non-aging continuous cast steel which is manufactured by further adding niobium and titanium to the ultra low carbon steel.

<Pretreatment Before Plating>

In manufacturing a steel sheet having a Zn—Ni alloy layer, firstly, Zn—Ni alloy plating is applied to a steel sheet in this embodiment. As the pretreatment applied to the steel sheet, usually, a scale (oxide layer) formed on a surface of the cold-rolled steel sheet is removed by applying electrolytic cleaning or cleaning by immersion to the cold-rolled steel sheet using an alkali solution containing caustic soda as a main agent. After the scale is removed, the steel sheet is rolled in a cold-rolling step until the steel sheet obtains a product thickness.

<Annealing>

After cleaning rolling oil which adheres to the steel sheet in rolling by electrolytic cleaning, the steel sheet is annealed. Annealing may be performed by either one of continuous annealing and box annealing, and is not limited specifically. After annealing is applied to the steel sheet, a shape of the steel sheet is modified.

<Zn—Ni Alloy Plating>

Next, Zn—Ni alloy plating is applied to the steel sheet. In the present invention, as a plating bath for forming a Zn—Ni alloy plating layer on the steel sheet, various bathes including a sulfuric acid bath, a chloride bath, a cyanide bath or the like can be used. The Zn—Ni alloy plating is performed under the following condition. That is, a Watts bath which is a representative bath in Ni plating is used as a basic bath, and the bath is carried out by adding Zn ions.

Composition of Plating Bath
nickel sulfate: 20 to 300 g/L
nickel chloride: 20 to 50 g/L
boric acid: 20 to 50 g/L
zinc sulfide: 20 to 300 g/L
pH: 1.5 to 2.0
bath temperature: 50 to 65° C.
current density: 5 to 50 A/dm$^2$ A boric acid which is added as a stabilizer may be replaced with a citric acid.

In the Zn—Ni alloy layer formed under the above-mentioned plating condition, it is preferable that the Zn—Ni alloy layer has the composition consisting of 4 to 16 at % (atomic percentage, atomic percentage being referred to as at % hereinafter) of Ni and Zn as a balance.

When the composition ratio of Ni in the Zn—Ni alloy layer is below 4 at %, a gas phase portion cannot acquire sufficient corrosion resistance.

When the composition ratio of Ni in the Zn—Ni alloy layer exceeds 16 at %, although the Zn—Ni alloy layer can acquire corrosion resistance when the steel sheet is in the form of a flat plate, workability of the Zn—Ni alloy layer is lowered due to hardening of the Zn—Ni alloy layer and hence, at the time of forming the steel sheet into a pipe, cracks occur in the alloy layer so that a ferrite is exposed whereby a gas phase portion cannot acquire sufficient corrosion resistance.

The adjustment of the composition ratios of components in the Zn—Ni alloy layer can be realized by adjusting the above-mentioned composition, pH, bath temperature, current density and the like of the above-mentioned plating bath within desirable ranges.

The composition ratio of Ni in the Zn—Ni alloy layer is calculated based on a ratio between zinc and nickel by EZ scanning using an X-ray fluorometric analyzer (ZSX 100e) made by Rigaku Corporation.

A thickness of the Zn—Ni alloy layer is measured by using an X-ray fluorometric analyzer (ZSX 100e) made by Rigaku Corporation and is set to 0.5 μm or more, and more preferably 3 to 10 μm. When the thickness of the Zn—Ni alloy layer is less than 0.5 μm, the worked portion cannot acquire sufficient corrosion resistance. When the thickness of the Zn—Ni alloy layer exceeds 10 μm, abrasion powder is produced at the time of forming thus deteriorating productivity. The adjustment of the thickness of the alloy layer can be realized by adjusting the above-mentioned composition, pH, bath temperature, current density and the like of the above-mentioned plating bath within desirable ranges.

<Pipe Forming>

A pipe is manufactured using the above-mentioned plated steel sheet on which the Zn—Ni alloy layer is formed in such a manner that a shape of the steel sheet is modified by a leveler, and the steel sheet is slit into a predetermined outer size by a slitter. Thereafter, the steel sheet is formed into a pipe shape by a former, and longitudinal edge surfaces of the steel sheet are seam-welded to each other by high frequency induction welding thus manufacturing the pipe. Thereafter, bending forming and other necessary forming are applied to the pipe.

The pipe may be manufactured after preparing a steel sheet whose shape is modified by a leveler and to which the slitting is applied by the slitter.

As the pipe, a fuel supply pipe for introducing fuel into a tank, a pipe for introducing fuel into an engine from a tank or a pipe for ventilation can be named.

Figure 3:
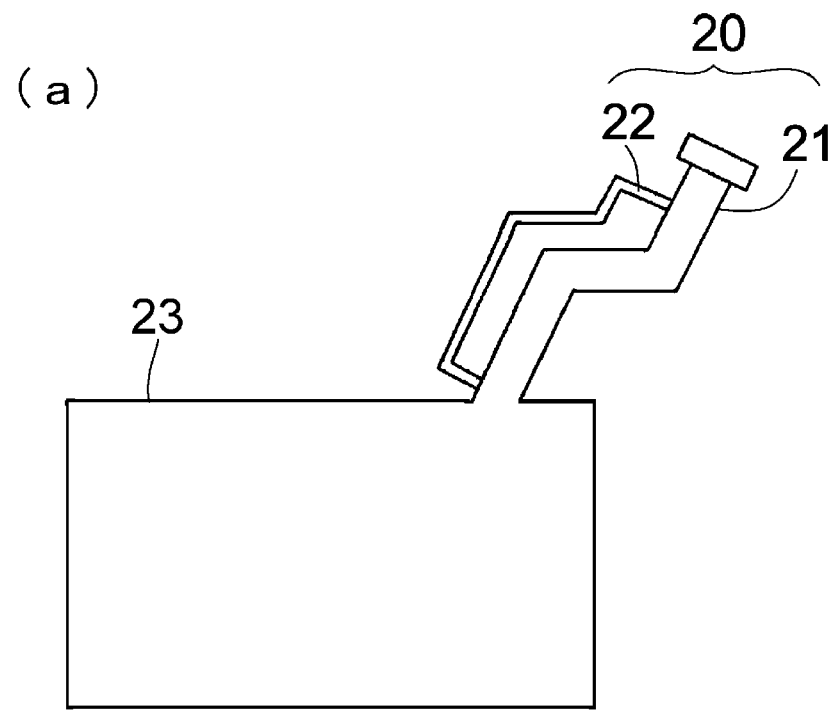
FIG. 3 is a schematic explanatory view of a fuel supply pipe which is manufactured using a steel sheet having a Zn—Ni alloy layer according to the present invention, wherein (a) shows a fuel supply pipe which includes: a large diameter pipe portion (a main pipe portion) through which the fuel passes; and a small diameter pipe portion (a breather pipe portion) which makes an upper portion of the main pipe portion and a lower portion of the main pipe portion communicate with each other for ventilation, and (b) shows a fuel supply pipe where a main pipe portion through which the fuel passes and a breather pipe portion are formed independently.
Figure 3:
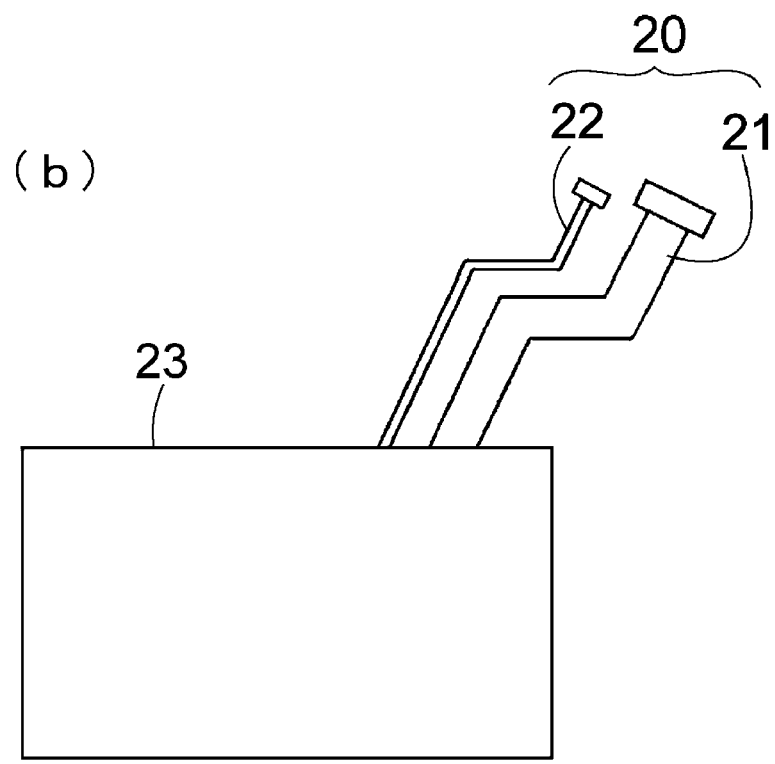

In mounting a fuel supply pipe 20 on a fuel tank 23, as shown in FIG. 3(a), the fuel supply pipe 20 is mounted on the fuel tank 23 in such a manner that the fuel supply pipe 20 extends obliquely in the upward direction from an upper portion of the fuel tank 23.

Further, a breather pipe portion 22 is connected to the fuel supply pipe 20 in such a manner that a breather pipe portion 22 is branched from a middle portion of a main pipe portion 21 through which fuel passes. The breather pipe portion 22 makes an upper portion of the main pipe portion 21 and a lower portion of the main pipe portion 21 communicate with each other for ventilation.

The main pipe portion 21 is manufactured using the steel sheet for manufacturing a pipe of the present invention. The breather pipe portion 22 may also be manufactured using the plated steel sheet of the present invention.

The fuel supply pipe 20 defined by the present invention is not limited to a shape shown in FIG. 3(a). For example, as shown in FIG. 3(b), even when the breather pipe portion 22 is mounted on the fuel tank 23 in a shape independent from a main pipe portion 21 through which fuel passes, there is no difference between the breather pipe portion 22 shown in FIG. 3(b) and the breather pipe portion 22 shown in FIG. 3(a) with respect to a point that the corrosion resistance against fuel vapor is particularly required and hence, the fuel supply pipe 20 defined by the present invention also includes the fuel supply pipe 20 shown in FIG. 3(b).

<Evaluation Method>

Evaluation specimens are prepared from Zn—Ni alloy steel sheets which have various thicknesses, and the corrosion resistances of the evaluation specimens are investigated by immersing these evaluation specimens into bioethanol mixed gasoline. The corrosion resistance is determined based on the presence or non-presence of formation of rust.

A corrosive liquid which experimentarily imitates bioethanol mixed gasoline is used.

A formic acid and an acetic acid are added to regular gasoline which is prescribed by JIS K2202, and 10 mass % of bioethanol which is stipulated in JASO M361 is further added to the regular gasoline thus producing imitated deteriorated gasoline.

Aiming at the further enhancement of corrosiveness, corrosive water is prepared by adding a formic acid, an acetic acid and chlorine to pure water, and 10 mass % of the corrosive water is added to the deteriorated gasoline thus preparing a corrosive liquid. The corrosive liquid is in a two-layered divided state where an upper layer is made of the deteriorated gasoline and a lower layer is made of the corrosive water. Evaluation specimens are arranged in a hermetically sealed container in a state where one half of each evaluation specimen on which a Zn—Ni alloy layer having a specified thickness is formed is immersed in the corrosive liquid, and the hermetically sealed container is held in a temperature controlled bath at a temperature of 45° C. for a predetermined time.

Figure 2:
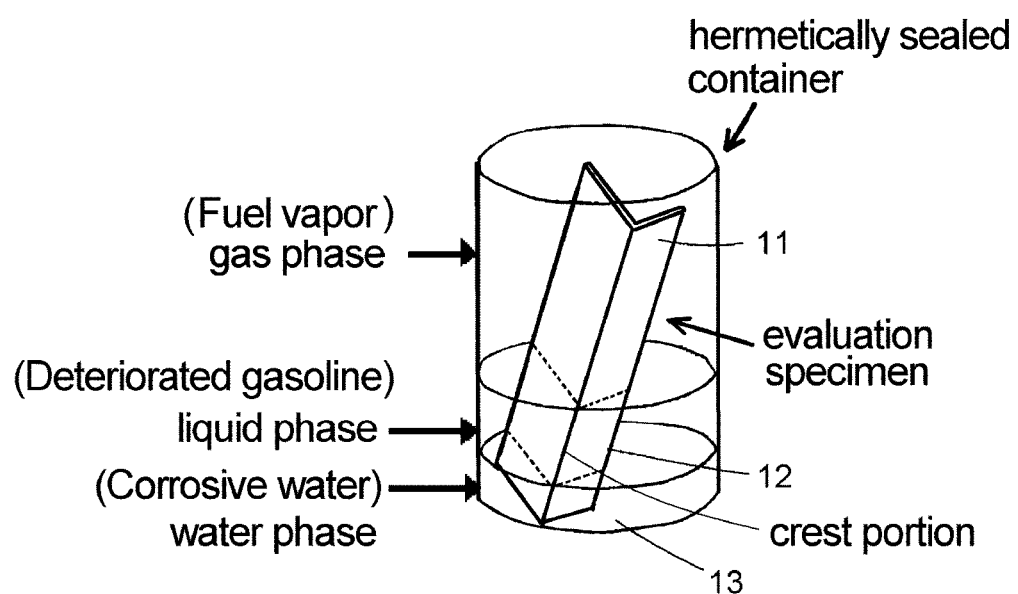
FIG. 2 is a schematic explanatory view showing a method for testing corrosion resistance of a steel sheet having a Zn—Ni alloy layer according to the present invention against bioethanol mixed gasoline.

As a result, as shown in FIG. 2, the evaluation specimen is formed of separated portions consisting of, in a descending order from above, a gas phase portion 11 which is brought into contact with fuel vapor (gas phase) of deteriorated gasoline, a liquid phase portion 12 which is brought into contact with deteriorated gasoline (liquid phase), and a water phase portion 13 which is brought into contact with corrosive water (water phase), and the evaluation is made based on the specimens in such a condition. Then, the corrosion resistance of the evaluation specimen against fuel vapor is evaluated by investigating the corrosion at the gas phase portion 11 of the evaluation specimen.

<Evaluation Based on 90° Bending>

With respect to respective evaluation specimens on which a Zn—Ni alloy layer is formed, by estimating the bending of a pipe, specimens each of which is bent at 90° with a surface thereof on which the Zn—Ni alloy layer is formed as a convex portion (a crest portion in FIG. 2) are used. A radius of a valley portion of a 90° bent portion, that is, a radius of a shoulder portion of a mold is set to 2.0 mm, and the formation of rust on a worked crest portion is evaluated.

From a result of many experiments, the formation of rust at the gas phase portion of the crest portion of the 90° bent portion is suppressed when a ratio of Ni in the Zn—Ni alloy layer is 4 to 16 at %.

When the ratio of Ni in the Zn—Ni alloy layer is less than 4 at %, although the alloy layer follows bending at 90°, the evaluation specimen cannot acquire sufficient corrosion resistance because of a large content of Zn in the Zn—Ni alloy layer.

On the other hand, when the ratio of Ni in the Zn—Ni alloy layer exceeds 16 at %, the alloy layer is hardened and hence, cracks occurs in the Zn—Ni alloy layer by bending at 90° and a corrosive liquid impregnates into the evaluation specimen from the cracks and hence, the evaluation specimen cannot acquire sufficient corrosion resistance.

Accordingly, based on the result of many experiments, it is found that the formation of rust at the gas phase portion of the evaluation specimen can be suppressed when the composition ratio of Ni in the Zn—Ni alloy layer is set to a value which falls within a range of 4 to 16 at %.

Further, FIG. 4 shows a method for measuring the elongation of a bent convex portion which is generated at the time of bending a plate material and a pipe material. That is, in bending the plate, as shown in FIG. 4(a), the elongation of the bent convex portion is obtained based on a plate thickness "t" and a radius "r" of a shoulder portion. Here, "r" is a radius of a shoulder portion of a mold which is used for bending the plate, and the elongation (%) of the bent convex portion is obtained by a calculation formula surrounded by a quadrangle shown in the drawing.

Further, in forming a pipe, as shown in FIG. 4(b), the elongation of the bent convex portion is obtained based on a diameter "T" of the pipe and a radius "R" of a shoulder portion of a mold. Here, "R" is a radius of a shoulder portion of the mold which is used for bending the pipe, and the elongation (%) of the bent convex portion is obtained by a calculation formula surrounded by a quadrangle in the drawing. For example, the elongation becomes 20% when a pipe having the diameter "T" of 30 mm is bent at the radius "R" of the shoulder portion of 60 mm, and this elongation is equal to the elongation obtained by bending a plate having a plate thickness of 1 mm at 90°.

EXAMPLES

The present invention is explained hereinafter in further detail using examples.

Examples 1 to 6

A low carbon aluminum-killed steel sheet having a plate thickness of 1.0 mm which is manufactured through cold-rolling and annealing is used as a material sheet.

The composition of a steel sheet which constitutes the plating material sheet is as follows.

C: 0.045 mass %, Mn: 0.23 mass %, Si: 0.02 mass %, P: 0.012 mass %, S: 0.009 mass %, Al: 0.063 mass %, N: 0.0036 mass %, balance: Fe and unavoidable impurities The steel sheet is subjected to alkali electrolytic cleaning and pickling by immersion into a sulfuric acid and, thereafter, Zn—Ni alloy plating is performed while changing a composition ratio of Ni thus manufacturing an alloy plated steel sheet for manufacturing a pipe.

The thickness of Zn—Ni alloy plating is measured using an X-ray fluorometric analyzer (ZSX 100e) made by Rigaku Corporation and is set to 3 μm.

The composition ratio of Ni in the Zn—Ni alloy layer is shown in Table 1. The composition ratio of Ni in the Zn—Ni alloy layer is measured by EZ scanning using an X-ray fluorometric analyzer (ZSX 100e) made by Rigaku Corporation. A thickness of the alloy layer is also measured using the X-ray fluorometric analyzer.

Comparison Examples 1 to 5

Plated steel sheets of comparison examples 1 to 5 are obtained in the same manner as the examples of the present invention except for that the composition ratio of Ni in the Zn—Ni alloy layer is changed to values shown in Table 1.

TABLE 1

| | Composition ratio of Ni in Zn—Ni alloy layer (at %) | Result of formation of red rust at gas phase portion | Result of formation of red rust at liquid phase portion |
|---|---|---|---|
| example 1 | 4 | not formed | not formed |
| example 2 | 9 | not formed | not formed |
| example 3 | 10 | not formed | not formed |
| example 4 | 12 | not formed | not formed |
| example 5 | 14 | not formed | not formed |
| example 6 | 16 | not formed | not formed |
| comparison example 1 | 0 | formed | not formed |
| comparison example 2 | 3 | formed | not formed |
| comparison example 3 | 20 | formed | not formed |
| comparison example 4 | 32 | formed | not formed |
| comparison example 5 | 45 | formed | not formed |

<Evaluation>

Evaluation specimens are prepared from the respective steel sheets having an alloy layer of the examples of the present invention and the comparison examples. After holding the evaluation specimens in the temperature-controlled bath at a temperature of 45° C. for 2000 hours, the appearance of the evaluation specimens is observed for investigating the formation of red rust at a gas phase portion and a liquid phase portion respectively. The result of the investigation is shown in a column "result of formation of red rust at gas phase portion" and a column "result of formation of red rust at liquid phase portion" in Table 1.

As shown in Table 1, the steel sheets having a Zn—Ni alloy layer of the examples 1 to 6 of the present invention suppress the formation of red rust both at the liquid phase portion and the gas phase portion.

Further, the appearance of plating is also favorable and hence, the steel sheets of the examples 1 to 6 of the present invention are excellent as a steel sheet for manufacturing a pipe having corrosion resistance against fuel vapor.

On the other hand, with respect to the plated steel sheets of the comparison examples 1 to 5, although the formation of rust is not observed at the liquid phase portion, red rust is formed at the gas phase portion so that the plated steel sheets of the comparison examples 1 to 5 exhibit poor practicability as a steel sheet for manufacturing a pipe which is required to possess corrosion resistance.

INDUSTRIAL APPLICABILITY

The steel sheet for manufacturing a pipe and the pipe manufactured using the steel sheet according to the present invention can suppress the formation of rust on the steel sheet and the pipe when the steel sheet and the pipe are exposed to vapor of fuel such as gasoline, bioethanol, diesel oil or bio-diesel fuel which constitutes fuel thus exhibiting excellent corrosion resistance against fuel vapor. Further, the deterioration of the fuel per se can be also suppressed. Accordingly, the steel sheet and the pipe according to the present invention have extremely high industrial applicability.

DESCRIPTION OF REFERENCE NUMBERS AND SIGNS

11: gas phase portion
12: liquid phase portion
13: water phase portion
20: fuel supply pipe
21: main pipe portion
22: breather pipe portion
23: fuel tank

What is claimed is:

1. A method for manufacturing a pipe having a bent portion which has excellent corrosion resistance against fuel vapor, the method comprising the steps of:
preparing a steel sheet for manufacturing a pipe which is characterized by having a zinc-nickel (Zn—Ni) alloy layer where a nickel content is 4 to 16 at % on at least one outermost surface of the steel sheet, a thickness of the zinc-nickel (Zn—Ni) alloy layer being set to 0.5 μm to 10 μm;
forming the steel sheet for manufacturing a pipe into a tubular shape such that the Zn—Ni alloy layer forms an inner surface of the pipe; and
applying bending to the pipe such that the elongation of a bent convex portion generated at the time of bending the pipe falls within 20%, wherein the zinc-nickel alloy layer comes into contact with the fuel vapor or fuel which passes in the pipe.

2. The method for manufacturing a pipe having a bent portion which has excellent corrosion resistance against fuel vapor according to claim 1, wherein the fuel includes gasoline, bioethanol, diesel oil or bio-diesel fuel.

* * * * *